March 8, 1949.  H. W. CARNES ET AL  2,463,852
SKIVING TOOL
Filed April 25, 1947  2 Sheets-Sheet 2
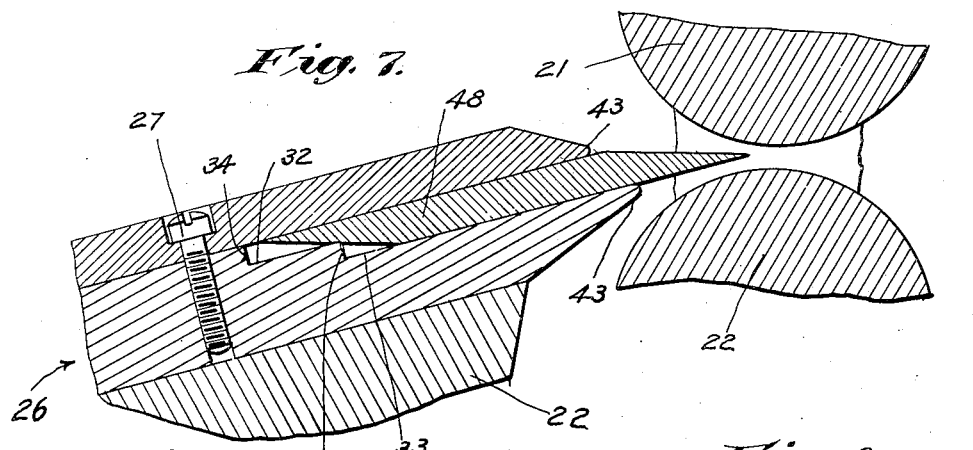
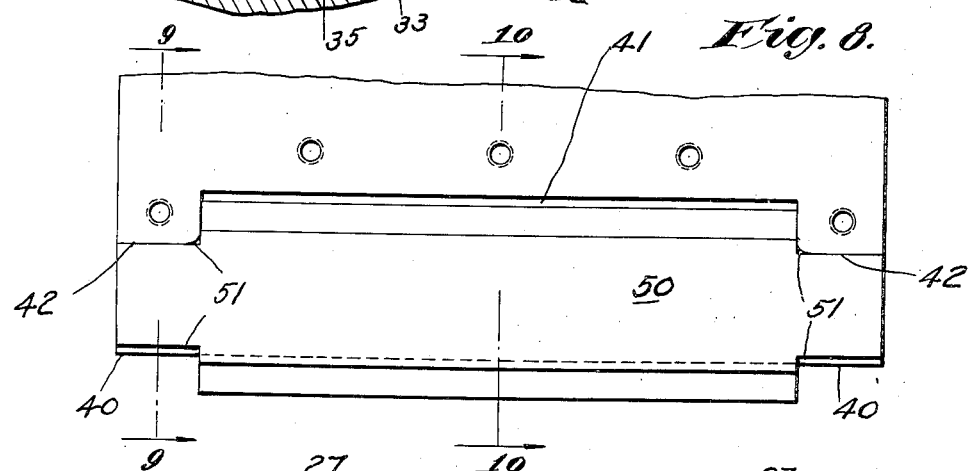
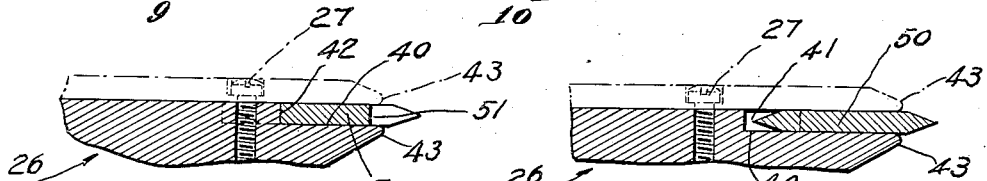
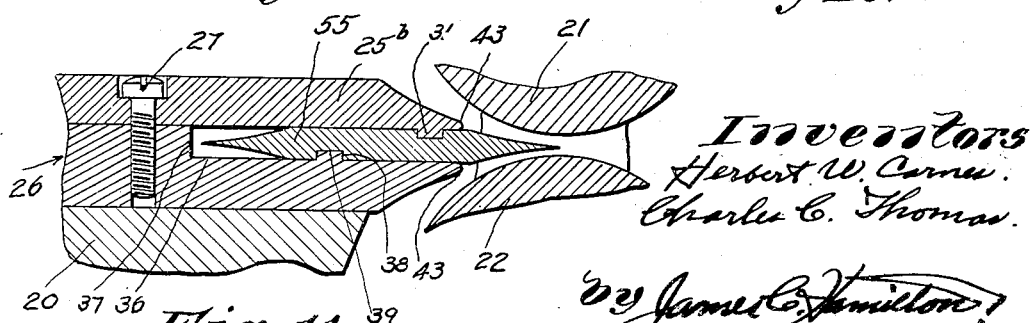
Inventors
Herbert W. Carnes
Charles C. Thomas
by James C. Hamilton
Atty Patented Mar. 8, 1949

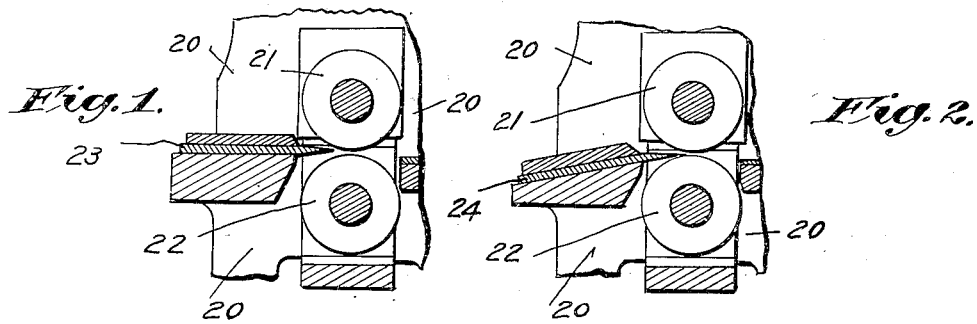
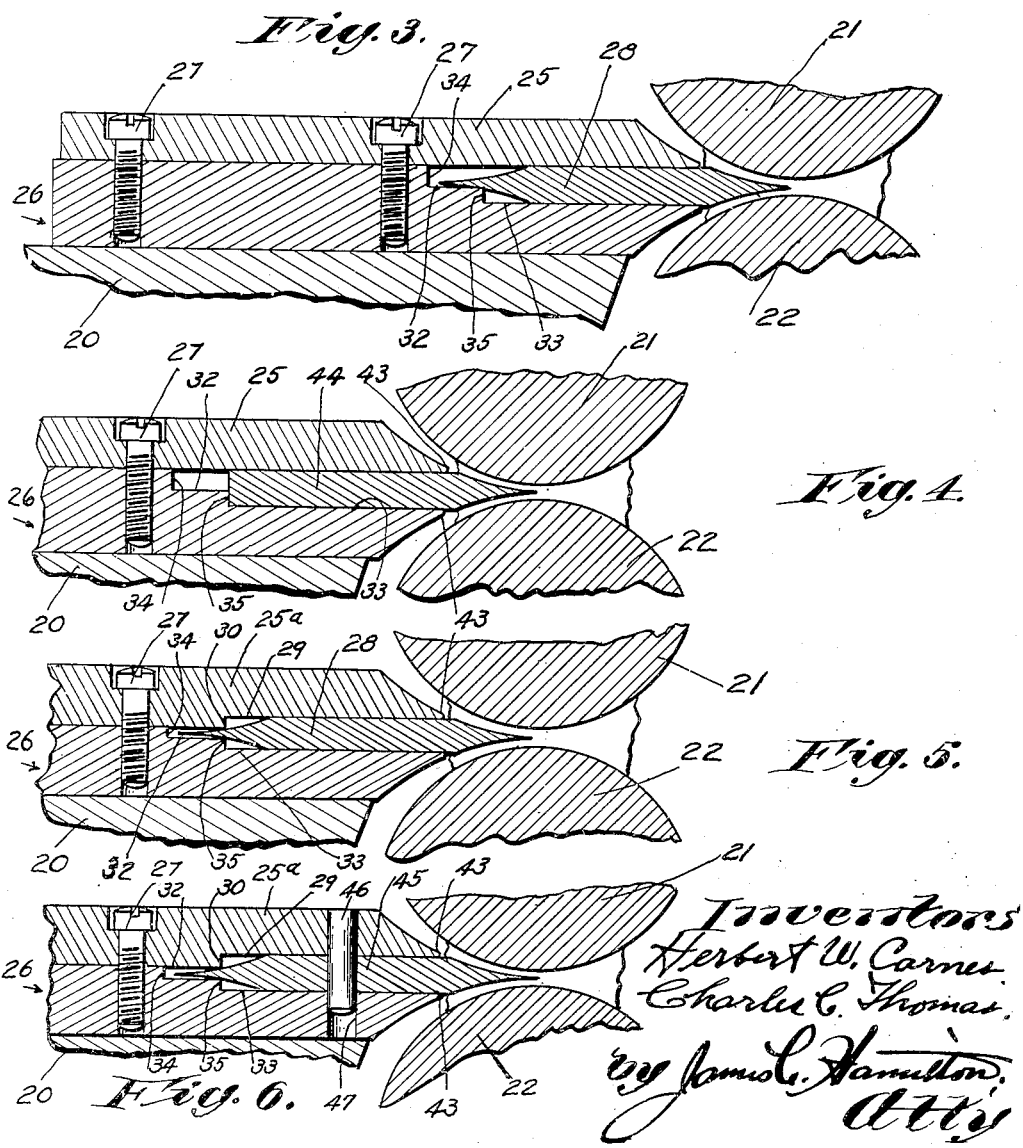

2,463,852

UNITED STATES PATENT OFFICE 2,463,852

SKIVING TOOL

Herbert W. Carnes, Swampscott, and Charles C. Thomas, Medford, Mass., assignors to Lacene Manufacturing Corporation, Lawrence, Mass., a corporation of New Hampshire Application April 25, 1947, Serial No. 743,896

3 Claims. (Cl. 69—13)

1

Our present invention relates to skiving tools and more particularly to renewable cutting blades in combination with blade holders which makes it possible to replace the cutting blades quickly and inexpensively as will be apparent further along in the specification.

It is well known in leather industry that the skiving or splitting of leather requires a very sharp blade which must be maintained in a fixed predetermined position at all times with respect to the mechanical equipment which is forcing the leather against the cutting edge of the cutting tool.

In the past, it has been the practice to make the cutting tool of the skiving apparatus approximately the same size as the holding-down plates and ground to a keen edge on one side only. These blades in grading machines, for instance, are about six inches across the cutting edge and several inches deep. Any cutting tool of this nature must of necessity be made from a very high quality of tool steel which is expensive as compared to other types of metal. It is also evident that the only interest the producer or the user has in an expensive piece of steel is the cutting edge which can be maintained against the material to be split. The material in the cutting blade which is back of the cutting edge area could just as well be composed of cheaper material but in order to make the tool this way it is necessary to weld two pieces of steel together which is also an expensive operation.

In our present invention, we have designated a combination holder and renewable blade which may be so formed in proportion and size that it may be quickly inserted in the holder with a minimum of time and, if desired reversed to present a new cutting edge, and in either event thrown away when dull and a new blade inserted in place thereof at a far greater saving of time and expense than would have been possible in the older and more conventional types of blades.

While we specifically mention the skiving of leather, as for instance in the grading of leather shoe soles, it is to be understood that our improved skiving tool might be used for numerous purposes where it is desirious of splitting a sheet material. For the purpose of illustration, and not in a limiting sense, we have referred to leather sole grading machinery.

In the shoe sole or sole grading industry skiving tools have been confined to heavy blade tools to a very great extent, as evidenced by the numerous patents granted to E. P. Nichols, No.

2

711,585, dated Oct. 21, 1902; L. A. Cogswell, No. 1,743,320, dated Jan. 14, 1930, and many other patents granted in between Cogswell and Nichols, and subsequent to Cogswell.

In our present invention, the principal object is to produce a skiving tool which is removable and replaceable with a minimum of operations;

Another object is to produce improved skiving tools having double opposed cutting edges which may be reversed for the purpose of presenting new keen cutting edges;

Still another object is to produce improved skiving tools which are self aligning and reversible for the purpose of minimizing time when changing over from one cutting edge to another, or when changing tools;

A still further object is a removable cutting tool in combination with a holder which is interlocking with the holder when clamped in place;

Another object is to produce a combination skiving blade and blade holder in which the blade is held in the holder in such manner that it may be reversed front to back presenting a new factory ground cutting edge with a minimum of time and effort;

A still further object is to produce a combination skiving blade and holder using double edged blades in which the holder is interchangeable with different types of blades both single and double edged blades, and Other objects and novel features comprising the construction and operation of our invention will be more apparent as the description of the device proceeds.

In the drawings illustrating the preferred embodiments of our invention:

Fig. 1 is a fragmentary cross-section taken through the power driven skiving rolls showing the relative position of the rolls to the splitting blade, and particularly showing the splitting knife horizontally disposed to the machine having a V ground cutting edge;

Fig. 2 is also a fragmentary cross-section taken through the power driven skiving rolls showing relative position of the driving rolls with respect to a splitting blade which is ground on one side and is set at an angle to the rolls;

Fig. 3 is an enlarged fragmentary cross-section similar to Fig. 1 showing a double edged splitting blade held in a special holder;

Fig. 4 is another enlarged fragmentary cross-section similar to Fig. 3 but showing a single edged blade and a different holder;

Fig. 5 is another enlarged fragmentary cross-section similar to Fig. 3 with slight modifications and showing a similar splitting blade held in a different manner;

Fig. 6 is still another enlarged fragmentary cross-section similar to Fig. 5 in which a dowel pin is used to locate the double edged blade shown in Figs. 3 and 5;

Fig. 7 is another fragmentary cross-section similar to Fig. 2 showing a double edged cutter in use in a holder similar to that shown in Fig. 3;

Fig. 8 is a plan view of a modified holder and blade the rear portion of the lower plate of the holder being broken off.

Fig. 9 is a cross-section taken on the line of 9—9 on Fig. 8;

Fig. 10 is another cross-section taken on the line of 10—10 of Fig. 8; and

Fig. 11 is still another fragmentary cross-section similar to Fig. 3 in which the double edged cutting blade is locked in the upper and lower holding plates in a different manner.

Referring more in detail to the drawings, 20 indicates the frame of a grading machine of the aforesaid Nichols or Cogswell type having driving rolls 21 and 22 mounted therein. These rolls are designed to force sheet material, such as sole leather through the rolls against a cutting blade such as 23 or 24 and thin down the over all thickness of the material to a predetermined thickness. The rolls 21 and 22 are adjustable vertically with respect to the blades 23 and 24 so that the material may be varied in thickness from the finish side to the rough side.

The setting of the rolls 21 and 22 in a grading machine designed to operate on shoe sole leather is known as grading which has no specific bearing on the present application, the present invention being restricted to the splitting or so-called skiving operation of the material whether it be leather or other kinds of material.

The first type of splitting or skiving knives, as shown in Figs. 3 to 6 inclusive and in Figs. 8 to 11, are horizontally mounted members having ground edges on opposite sides of the blade, or on only one side of the blade.

In Fig. 7 a different type of blade is shown which may be ground on one side of the blank and reversely on the other side. These types of blades are used in assemblies, as shown in Fig. 2 but may also be used in holders as shown in Figs. 3, 4 and 6.

In Figs. 3 to 11 inclusive, it is to be understood that the base member 26 is secured to the frame 20 of the machine in any convenient manner. The present invention being concerned with apparatus mounted thereon.

In our present invention there are three basic elements. The first of these is the blade which does the work and the means for holding this blade in place while this work is being done. The second element is the upper plate, and the third element is the lower plate. All three of these elements are secured together and may be adjustably mounted upon the machine structure 20.

Throughout the present invention the description and claims are directed to the three above mentioned elements. As viewed in Fig. 3 the upper plate 25 is flat and is secured to the lower plate 26 by means of machine screws 27.

Fig. 3 shows a cutting or splitting blade 28 which is hollow ground on opposite sides to produce a very keen cutting edge. The holder for the blade 28 comprises the upper plate 25 and the lower plate 26. In Figs. 3, 4, and 7 to 10 inclusive the upper plate 25 is identical the lower face being a flat plane. In Figs. 5 and 6 the upper plates 25a are identical but are slightly different, the lower face having a stepped back face 29 providing an abutment 30. In Fig. 11 the upper plate 25b is provided with key strip 31. This key strip 31 may be formed as shown or may be an inserted key member one being the equivalent of the other.

In Figs. 3, 4, 5, 6 and 7 the lower plate 26 may be the same having stepped back faces 32 and 33 which produce abutments 34 and 35. In Fig. 11 the lower plate 26 is provided with a stepped back face 36 resulting in the abutment 37 and a second abutment 38 is formed by means of the key strip 39 which like strip 31 may also be substituted for by means of an inserted key.

In Figs. 8, 9 and 10 the lower plate 26 is stepped back at 40 and recessed to the rear to form the area indicated at 41 which provides the abutments 42.

One feature which is common to both the upper plate 25 and lower plate 26 in all figures is the rounded edge 43 on the leading edges of the holders. This is an important feature of the invention as the rounded edge turns aside split material sliding over the two sides of the blades and directs it up the curved sides of the upper and lower plates thereby preventing the split material from entering between contacting faces of the plates and the blade.

In Fig. 3 the blade 28 engages against the abutment 35 which holds the blade from further movement to the rear in the holder. In Fig. 5 the same thing takes place excepting there are two abutments 30 and 35. If a single edge blade is used, as in Fig. 4, the abutment 35 holds the backward movement of the blade 44. Blade 44 may be used in any of the holders shown in Figs. 3, 4, 5, 6 or 7.

In Fig. 6 the blade 45 and the plates are slightly different in that a dowel pin 46 is located in the upper plate and a hole 47 is provided in the lower plate to receive it, the pin passing through a hole provided in the blade 45. The same blade 45 may however be used in any other holder accommodating the blades 28, 44 or 48.

In Figs. 8 to 10 inclusive the blade 50 is provided with backed off abutments 51 on each end of the blade which engage the abutments 42 on the lower plate.

In Fig. 11 the blade 55 is grooved to receive the abutments 31 and 39 on the upper and lower plates respectively. This blade may be used in any of the holders shown in Figs. 3 to 7 inclusive as well as in Fig. 11 and is reversible in any of them.

It will thus be seen that in every instance we are able to make use of a skiving blade of very narrow width which may be inserted in the holder members very easily and quickly and which may present one or two cutting edges, and because of the fact that a narrow strip of tool steel can be used, the cost of such blades can be reduced to a point where it is actually cheaper to insert a new blade and throw the old blade away than to attempt to regrind the old type of blade. Aside from the matter of cost, regrinding of old blades by the operator does not always produce good results because a poor grinding job will result in poor skiving. With this replaceable blade these difficulties are eliminated because the new blades are factory ground to rigid specifications, each blade being an exact duplicate of the other.

While we have shown our invention somewhat in detail and in modified forms yet it is to be understood that we may vary the proportions and make substitution of equivalents within wide latitude while still keeping within the spirit of the appended claims.

Having thus described our invention, what we claim as new is:

1. An improved tool for skiving leather and the like comprising, a holder having an upper and lower side, a double edge blade located between said sides adjacent the working side of the holder, rounded lips located on said holder sides adjacent said blade, abutment means located inside said holder engaging the rear edge of said blade for the purpose of receiving thrust applied to the operating edge of said blade.

2. In a skiving tool as set forth in claim 1 in which the leading edge of said holder is engaged with the operating edge of said blade at an acute angle terminating in a rounded edge against the blade proper.

3. In a skiving tool as set forth in claim 1 in which said blade is provided with abutment means on each end of said blade engaging with the abutment means of said holder.

HERBERT W. CARNES.
CHARLES C. THOMAS.

REFERENCES CITED

The following references are of record in the file of this patent:

UNITED STATES PATENTS

| Number | Name | Date |
|---|---|---|
| 342,983 | Tyler | June 1, 1886 |
| 1,383,133 | Locke | June 28, 1921 |
| 1,594,875 | Brenner | Aug. 3, 1926 |